(12) United States Patent
Calabrese

(10) Patent No.: US 10,070,628 B2
(45) Date of Patent: Sep. 11, 2018

(54) MARINE AQUARIUM WATER PURIFICATION AND SALINITY CONTROL APPARATUS AND METHOD

(71) Applicant: Gerard Calabrese, Southwest Ranches, FL (US)

(72) Inventor: Gerard Calabrese, Southwest Ranches, FL (US)

(*) Notice: Subject to any disclaimer, the term of this patent is extended or adjusted under 35 U.S.C. 154(b) by 297 days.

(21) Appl. No.: 14/944,493

(22) Filed: Nov. 18, 2015

(65) Prior Publication Data
US 2017/0135324 A1 May 18, 2017

(51) Int. Cl.
| | |
|---|---|
| A01K 61/00 | (2017.01) |
| A01K 63/04 | (2006.01) |
| B01D 29/00 | (2006.01) |
| C02F 1/00 | (2006.01) |
| C02F 1/44 | (2006.01) |
| C02F 1/42 | (2006.01) |
| C02F 9/00 | (2006.01) |

(Continued)

(52) U.S. Cl.
CPC .............. *A01K 63/04* (2013.01); *A01K 61/00* (2013.01); *A01K 63/045* (2013.01); *A01K 63/047* (2013.01); *C02F 1/006* (2013.01); *C02F 1/008* (2013.01); *C02F 1/283* (2013.01); *C02F 1/42* (2013.01); *C02F 1/441* (2013.01); *C02F 9/00* (2013.01); *C02F 2101/12* (2013.01); *C02F 2209/05* (2013.01); *C02F 2209/42* (2013.01); *C02F 2307/00* (2013.01)

(58) Field of Classification Search
CPC ...... A01K 63/04; A01K 61/00; A01K 63/045; C02F 2209/40; C02F 3/006; C02F 2209/42; C02F 1/006; C02F 1/008; C02F 1/283; C02F 1/42; C02F 1/441

USPC .............. 119/215, 245, 259; 210/416.2, 293, 210/167.21

See application file for complete search history.

(56) References Cited

U.S. PATENT DOCUMENTS

| | | | | |
|---|---|---|---|---|
| 5,433,843 A | * | 7/1995 | Calabrese | A01K 63/04 119/259 |
| 6,244,219 B1 | * | 6/2001 | Krum | A01K 63/04 119/231 |

OTHER PUBLICATIONS

Reef Central, "http://www.reefcentral.com/forums/showthread.php?t=1711626&page=19", "Salt Water Mixing Stations Let's See Them", pp. 1-22 (Year: 2013).*

(Continued)

*Primary Examiner* — Claire A Norris
(74) *Attorney, Agent, or Firm* — Laurence A. Greenberg; Werner H. Stemer; Ralph E. Locher

(57) ABSTRACT

A water salinity control apparatus for a marine aquarium includes a filter section in which the water from a utility water supply is purified and deionized. A reservoir section includes a purified water reservoir for purified water, a salt-mixed water reservoir in which marine water at the setpoint salinity is stored, and a salt concentrate reservoir which contains fully salt-saturated water. A pump section includes pumps for pumping water from the salt-mixed water reservoir into the aquarium and for pumping water from the purified water reservoir to the aquarium. A control system adjusts the salinity of the water in the salt-mixed water reservoir and the salinity of the water in the marine aquarium. The control system receives input from salinity measuring probes that measure the salinity in the salt-mixed water reservoir and the salinity of the water of the marine aquarium.

9 Claims, 3 Drawing Sheets

(51) Int. Cl.
*C02F 1/28* (2006.01)
*C02F 101/12* (2006.01)

(56) References Cited

OTHER PUBLICATIONS

Reef Central, "Ro/Dl 4,5,6 stage ?????'s", "http://reefcentral.com/forums/showthread.php?t=1881735", pp. 1-6 (Year: 2010).*

* cited by examiner

MARINE AQUARIUM WATER PURIFICATION AND SALINITY CONTROL APPARATUS AND METHOD

BACKGROUND OF THE INVENTION

Field of the Invention

The invention relates to a system for automatically changing the water of a marine aquarium.

Probably the most important aspect of owning and maintaining a saltwater aquarium is the water change. Changing the water is an absolute necessity for maintaining a healthy ionic balance of the aquarium water. There does not appear to exist a more significant aquarium parameter affecting the health of fish and corals then the water in which they are immersed.

The invention is a further development of my prior system, the DialySeas system, described in my earlier patent U.S. Pat. No. 5,433,843. The description of my earlier patent is herewith incorporated by reference in its entirety. The prior art DialySeas system is designed to be implemented in close proximity to the aquarium which requires an automated water change device. The DialySeas system is based on three primary processes, namely, diffusion, osmosis and hydrostatic pressure. Therefore the proximity of the unit to the aquarium is essential. The advantage of the type of system is the conservation of the aquarium salt. The DialySeas effectively changes water while preserving roughly 60% of the original salt.

While the DialySeas system is still a very dependable and superior system, there exists a demand for an alternative system. That is, there exists a need for a system which provides for similar end results as the DialySeas system, but does not require the Dialyzer, "the human artificial kidney" to correct the ionic imbalance of the aquarium water and which does not require close proximal placement relative to the aquarium.

SUMMARY OF THE INVENTION

It is accordingly an object of the invention to provide a water purification and salinity control system for a marine aquarium, which overcomes a variety of disadvantages associated with the heretofore-known devices of this general type and which makes it possible, in the context of a relatively inexpensive system, to provide for a nearly self-contained system which provides for the supply of purified water at a proper purity level and with exactly adjusted salinity.

I have now been able to develop such a system. With the foregoing and other objects in view there is provided, in accordance with the invention, a water purification and salinity control apparatus for a marine aquarium, comprising:

a filter section including a water inlet and filters configured to generate purified water suitable for use in the marine aquarium;

a reservoir section including a purified water reservoir for purified water connected to receive purified water from the filter section, a salt-mixed water reservoir connected to receive water from the purified water reservoir, and a salt concentrate reservoir having an overflow conduit at an upper level thereof for allowing water to overflow into the salt-mixed reservoir;

a pump section including:
one or more pumps hydraulically connected to pump water from the salt-mixed water reservoir into the salt concentrate reservoir, to pump water from the salt-mixed water reservoir to the aquarium, and to pump water from the purified water reservoir to the aquarium; and
a pump hydraulically connected to draw water out of the aquarium;

a control system for adjusting a salinity of the water contained in the salt-mixed water reservoir and for adjusting a salinity of the water in the marine aquarium, the control system including a controller connected to the pumps of the pump section and to a plurality of salinity measuring probes, the probes including a probe disposed to measure the salinity in the salt-mixed water reservoir and a probe disposed to measure the salinity of the water of the marine aquarium.

In accordance with a preferred embodiment of the invention, the filter section includes a particulate filter, a carbon activated filter, a reverse osmosis filter and a deionizer configured to generate deionized water from the water received at the water inlet.

The novel system is not subject to the limitations of the earlier DialySeas device, primarily the requirement for the close proximity to the aquarium. It does not rely on diffusion, osmosis and hydrostatic pressure. The novel system does not reuse the aquarium water as the DialySeas did after the dialysis process. The saltwater is directly removed from the aquarium and replaced with 100% new water at the predetermined salinity that the user selects.

In accordance with an added feature of the invention, there is provided a liquid level sensor disposed to sense whether or not a liquid level in the salt mixed water reservoir is above or below a setpoint fill level and connected to the valve, wherein the valve is turned on when the setpoint fill level is undershot.

In accordance with an additional feature of the invention, the one or more pumps of the pump section comprise:

a first pump hydraulically connected to pump water from the salt-mixed water reservoir into the salt concentrate reservoir;

a second pump hydraulically connected to pump water from the salt-mixed water reservoir to the aquarium; and a third pump hydraulically connected to pump water from the purified water reservoir to the aquarium.

One of the great advantages of the system according to the invention is the fact that a fully saturated salt solution may be held at 30-50 times the concentration of the finally adjusted solution that is suitable for feeding into the aquarium. The system may be constructed quite compact and easy to maintain.

In accordance with a preferred feature of the invention, the water pumps used in the system are positive displacement pumps, i.e., peristaltic pumps.

With the above and other objects in view there is also provided, in accordance with the invention, a salinity control method for a marine aquarium having an aquarium tank holding saltwater, the method comprising:

connecting a water purification and salinity control apparatus for a marine aquarium as described above to the marine aquarium;

flooding the reservoirs of the reservoir section with water and adjusting a salinity of the contents of the reservoirs until the purified water reservoir contains deionized water, the salt-concentrate water reservoir contains water with saturated salinity, and the salt-mixed water reservoir contains water have a salinity substantially corresponding to a desired salinity in the marine aquarium;

pumping water from the aquarium and measuring a salinity of the aquarium water;

if the salinity of the aquarium water lies above the desired salinity, pumping deionized water from the purified water reservoir into the aquarium;

if the salinity of the aquarium water lies at or below the desired salinity, pumping salt-mixed water from the salt-mixed water reservoir into the aquarium.

Quite importantly, also, the preferred embodiment provides for unassisted automatic operation, and predetermined scheduled operation. The preferred embodiment can be used with existing filtration techniques as a supplement or as a single system to provide desirable water conditions. The preferred embodiment can be sized up or down to accommodate any size closed system.

Other features which are considered as characteristic for the invention are set forth in the appended claims.

Although the invention is illustrated and described herein as embodied in a water purification and salinity control system for marine aquaria, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawing.

DESCRIPTION OF AN EXEMPLARY EMBODIMENT

Figure 1:
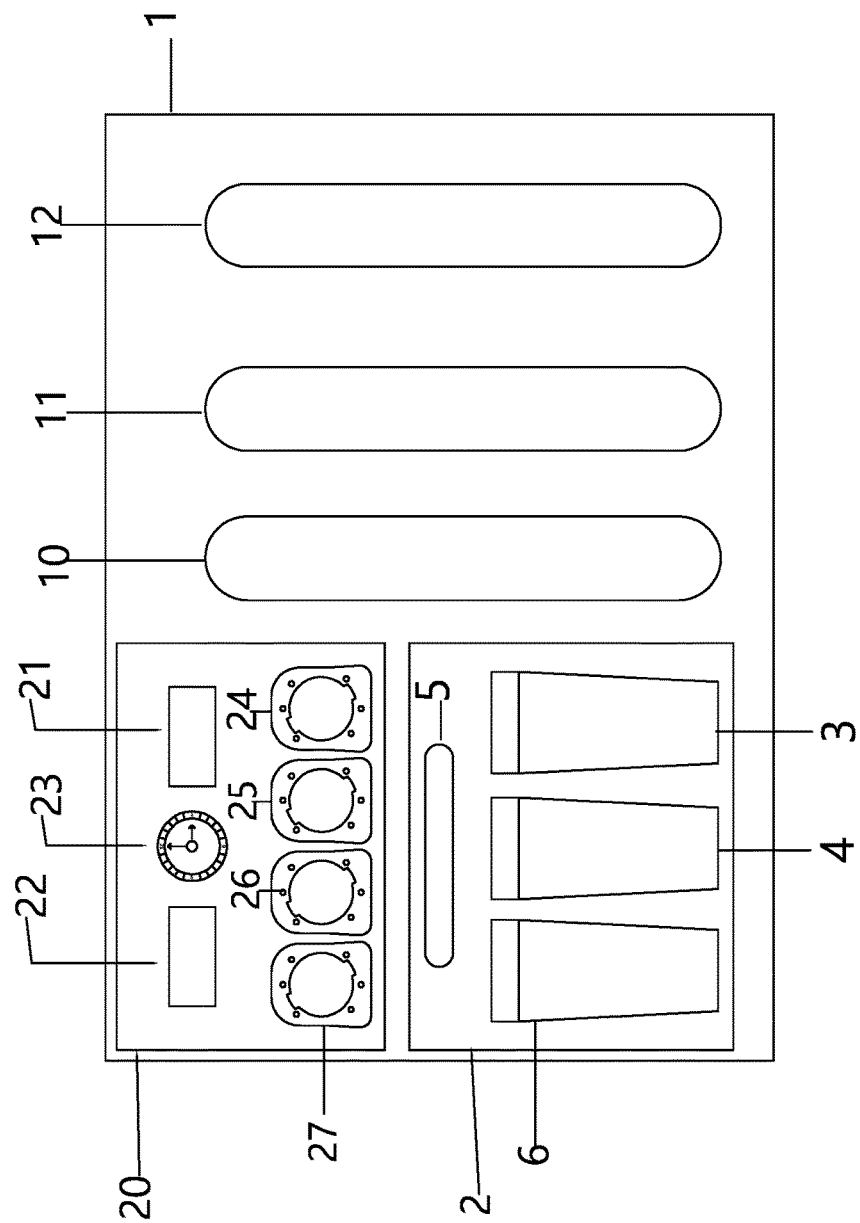
FIG. 1 is a schematic view of a closed loop water purification and salinity control apparatus according to the invention.

Referring now to the figures of the drawing in detail and first, particularly, to FIG. 1 thereof, there is shown a front view of an integrated control apparatus according to the invention. The apparatus is fully integrated in a housing 1 which houses various system components in three general sections. One of the sections is a filter section 2 in which water from a water supply, such as city water, is purified and converted to deionized water. The filter section includes a particulate filter 3, which may advantageously be provided with a 1 micron filter. The filter 3 is a 1 micron rated pleated cartridge filter for removing particles that might be in the water supply line. The particulate filter 3 is followed by a carbon filter 4, i.e., an activated carbon filter, which is essentially used to remove chlorine from the incoming water. The carbon filter 4 is in turn followed by an RO (reverse osmosis) filter 5. The RO filter 5 is followed by a deionizer 6 in the water flow direction. The filters 3, 4, and 6 in the preferred embodiment are cartridge filters with see-through containers that indicate visibly when they need cleaning and that are easily manually exchanged for manual cleaning.

A further section of the apparatus is a reservoir section with a reservoir 10 for DI (deionized) water, a reservoir 11 for salt mixed water, and a reservoir 12 for salt concentrate. As will be explained in the following, the reservoir 12 contains salt water at salt saturation and a reserve of dissolvable salt. The reservoir 11 contains salt water at a salinity that is adjusted for use in the marine aquarium, or with a slightly higher salinity.

In a preferred embodiment of the apparatus, the reservoirs 10 and 11 use 3-gallon containers (~11 liters) and the reservoir 12 uses a 5-gallon container (~19 liters). These parameters have been found to be suitable for medium to large home aquariums. Correspondingly greater dimensions will be used for larger and exhibit aquariums. It is also possible to use a plurality of the said apparatus in parallel.

A third section of the apparatus is a control and pump section 20. The section includes a controller 21 for controlling the apparatus itself and a controller 22 for controlling the water feed to an aquarium that is connected to the apparatus. There is also provided a clock controller 23 which enables setting the times during which the apparatus is active so as to recycle and refresh the aquarium water. There are also provided four pumps. A first pump 24 is connected to pump water from the salt mixed reservoir (SMR) 11 to the salt concentrate reservoir (SCR) 12. A second pump 25 is connected to pump salt water from the SMR reservoir 11 to the aquarium. A third pump 26 is connected to pump DI water from the deionized water reservoir (DIR) 10 to the aquarium. A fourth pump 27 is an aquarium transfer pump, which is connected to pump water from the aquarium to a drain or to another aquarium.

The pumps 24-27 are peristaltic pumps (positive displacement pumps) which, advantageously, run on 12 VDC. By way of example, I have utilized peristaltic pumps commercially available from the company Honlite. The preferred pumps are rated at 100 ml/min, 12 VDC, part No. HBP-12-100-ZB-2-PB. The functionality of the pumping system and the control sequences will become clear from the description below.

In an alternative embodiment, the several pumps may be combined into fewer pumps. Instead of the straightforward fluidic connections described in the context of the preferred embodiment of the apparatus, it is also possible to instead provide multi-position valves. It is then possible, for instance, to utilize a single pump for the exchange between the SMR 11 and the SCR 12, and also for pumping DI water from the DIR 10 to the aquarium or salt-mixed water from the SMR 11 to the aquarium. The corresponding plumbing connections may thereby be set by way of a three-way or four-way valve.

Figure 2:
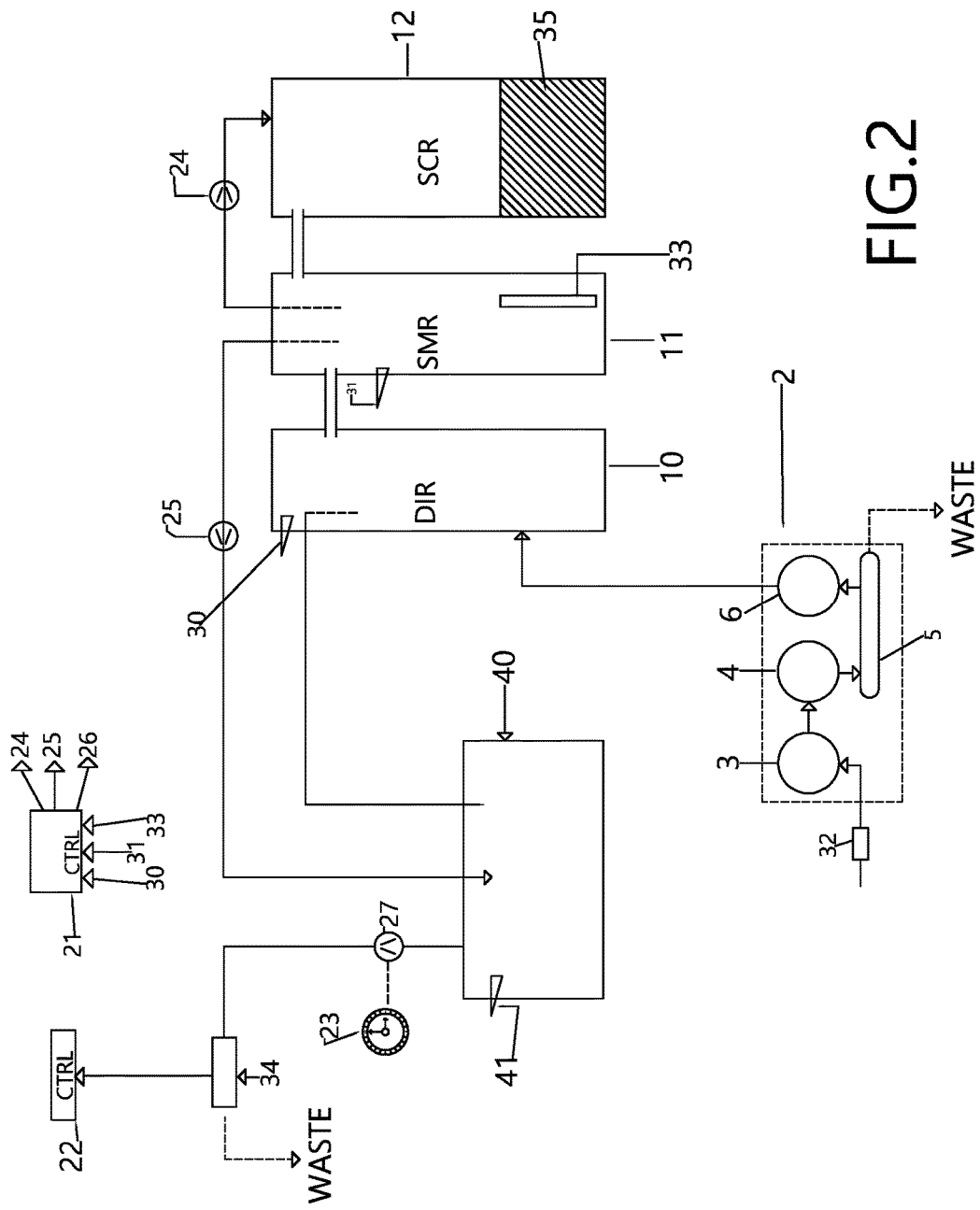
FIG. 2 is a schematic diagram illustrating the salinity control system according to the invention.

Turning now to FIG. 2, there is shown a details diagrammatic and schematic view of the control system according to the invention. I shall first describe the system in a sequential order, first to initialize the system and then to effect aquarium water exchange.

After the apparatus is hydraulically connected to a water supply (e.g., city water) on the filter side and also to the aquarium on the pump side, a water valve 32 is opened in order to flush the first filter 3. From there, the water traverses the filters 4, 5, and 6, whereupon the water is substantially cleaned and deionized. From the filter section 2, the water now enters the DIR (deionized water reservoir) 10. After the water reaches a given fill level in the DIR 10, it overflows into the SMR (salt mixed reservoir) 11. The overflow opening from the DIR 10 to the SMR 11 is just below the level of a float switch 30 in DIR 10. A float switch 31 is disposed in the SMR 11 just below the level of the overflow opening from the DIR 10 to the SMR 11.

After filling the reservoirs DIR 10 and SMR 11, the water is pumped from the SMR 11 to the SCR (salt concentrate reservoir) 12. It will be understood that, during the initialization of the system, the water entering the SCR 12 is deionized water. As the water level in the SCR 12 rises, it dissolves the salt 35 at the bottom of the reservoir. The dissolution creates salt-saturated water in the SCR 12. Since sodium chloride is readily dissolved, no mixing inside the SCR 12 is necessary. The water automatically reaches saturation. The pump 24 pumps water from the SMR 11 into the SCR 12 until the overflow connection from the SCR 12 to the SMR 11 returns saturated water to the SMR 11. A probe 33 in the SMR 11 signals a salinity value to the controller 21. When the salinity in the SMR 11 reaches the setpoint value, the pump 24 is turned off. This also ceases the overflow of saturated water from the SCR 12 into the SMR 11.

By way of example, I have used salt 35 that is provided in powder form. It is generally referred to as Instant Ocean Sea Salt Mix. While I shall refer to it as "salt" or "sea salt," the mix contains a multitude of components, with a substantial balance of cations (e.g., Na, K, Mg, Ca, Sr) and anions (e.g., Cl, $SO_4$, $TCO_2$, TB). Various nutrients and trace amounts are typically present as well. Depending on the type of aquarium, a variety of compositions are available. The primary elements, of course, are $Na^+$ and $Cl^-$.

When the float switch 31 and the float switch 30 close, the water supply to the DIR 10 is turned off by closing the valve 32. This also ceases the water feed into the SMR 11. At this point, the setpoint salinity values have been achieved or, more typically, the pump 24 continues to operate until the proper setpoint salinity in the SMR 11 has been reached. The water in the DIR 10 is deionized. The salinity of the water in the SMR 11 is at a setpoint value that is typically slightly above the setpoint for the aquarium. The salinity in the SCR 12 is at saturation. At this time, the apparatus has been initialized and the system is ready for proper salinity control of the aquarium.

With regard to the positions of the various fill level sensors and the overflow conduits: The overflow conduit from the SCR 12 to the SMR 11 is at the highest level. The float switch 30 lies slightly below the overflow and above the overflow conduit between the DIR 10 and the SMR 11. Last, the float switch 31 lies below the level of the latter overflow conduit. Accordingly, the liquids between the reservoirs 11 and 12 may be exchanged independently of the other operations by turning on the pump 24. If the salinity sensor 33 issues a signal that indicates that the salinity of the liquid in the SMR 11 lies below the desired setpoint value, the salt mixed water is pumped through the pump 24 into the SCR 12. In response, fully saturated salt water returns through the overflow conduit into the SMR 11. This process raises the salinity of the liquid in the SMR 11. When the setpoint salinity in the SMR 11 is reached—as reported by the conductivity sensor 33—the pump 24 is turned off. In order not to allow any salt to enter the DIR 10 and to contaminate the DI water (i.e., to to increase the salt concentration of the deionized water), a check valve may be integrated into the overflow conduit between the DIR 10 and the SMR 11.

The valve 32 is also set to automatically open the water supply when the float switch 31 in the SMR 11 opens. This indicates a low water level and commands an automatic refill. For safety reasons, it is possible to also include the float switch 30, so that the valve 32 is turned on only when both float switches 30 and 31 indicate a low water level. It will be understood that, while I refer to the switches 30 and 31 (and switch 41) as float switches, they are simply fill level switches that indicate by a Boolean signal whether the liquid level in the controlled space is below or above a certain level. By way of example, I have used float switches that are commercially available through the company Innovative Components (part No. 93609).

Figure 3:
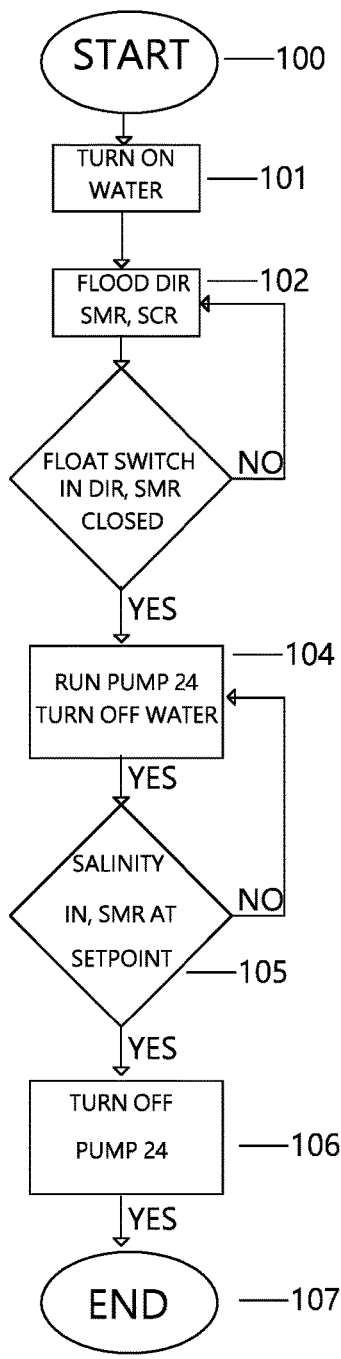
FIG. 3 is a flowchart illustrating the initialization of the apparatus.

With reference to FIG. 3, the apparatus is first rendered functional by effecting an initialization sequence. First, upon starting the sequence at 100, the water supply is turned on at step 101. The water traverses the filter section 2 and enters the reservoir section in the form of DI water. The three reservoirs 10, 11, 12 are sequentially flooded during the water feed 102 until the float switches 31 and 30 report that the high water mark has been reached. At this point, the water feed is turned off by closing the valve 32 and the pump 24 is turned on at step 104. This causes water from the SMR 11 to drip into the SCR 12 and higher-salinity water to return through the overflow conduit between the SCR 12 and the SMR 11. Due to this mixing, the salinity in the SMR 11 is raised until the probe 33 reports that the salinity has reached the desired setpoint. At that time, the pump 24 is turned off at step 106 and the initialization is ended at step 107.

The salinity control and the water exchange with the aquarium are controlled by the controller 22. First, water is pumped from the aquarium via the transfer pump 27. The pump 27 may be triggered by way of the timer 23 or it may be manually started. The salinity of the water that is being pumped from the aquarium by the pump 27 is measured in a probe 34 before it is dumped via a drain or conducted into another aquarium. The probe 34 issues a salinity signal, which indicates the salinity of the water in the aquarium 40 to the controller 22.

Assuming that the salinity is too high, which may have been caused, for example, by evaporation in the aquarium, the controller 22 starts up the pump 26. This causes deionized water to be pumped into the aquarium 40. Once the desired salinity is reached, or even undershot, the controller turns on the pump 25 and turns off the pump 26. This causes salt mixed water to be pumped into the aquarium 40. Since the water in the SMR 11 has a salinity which is at or very near the desired salinity in the aquarium 40, the water being pumped out of the aquarium is being replaced by clean water which has the same salinity. If, for some reason, the controller 22 reads a salinity value that is below the setpoint as directed by the controller 22, then the system is halted. This prevents a hypo-salinity situation from possibly being reached. The aquarium is also provided with a fill level switch, such as a float switch 41, which assures that the water level in the aquarium does not overshoot a safe level. In addition, a low float switch level signal commands the pump 25 or the pump 26 to turn on, depending on the salinity information received from the probe 34.

There exist various possibilities to measure the salinity of the marine aquarium water. Salinity is measured either with refractometers (unit: ppt), hydrometers (specific gravity), or conductivity probes. The system herein utilizes conductivity probes, which output a signal at milli-Siemens (mS) or micro-Siemens (µS) units. Saturation of water with NaCl is reached at approximately 225 mS. The typical conductivity used in marine aquariums is approximately 53 mS/cm.

By way of example, I have used conductivity probes that are commercially available through the company Analytical Sensors. The conductivity controller is available through Jenco Instruments (e.g., Part No. 3101). The unit may also be controlled by a PC or a micro controller.

While the above description does not provide specific information regarding the electrical/signal connections of the various components, it will be understood that the connections may all be hard-wired or even wireless. The various pumps are typically driven at 12 VDC, so that they are best directly connected to the respective controller 21, 22, which provides the corresponding voltage signal. The various probes 33, 34, etc. may also be directly wired to the controllers. The float switches 30, 31, 41, the valve 32, the timer clock 23, etc. may also be directly wired or they may be connected through a signal bus.

Each of the reservoirs 10, 11, 12 may also be provided with heaters, by way of which the respective liquid is maintained at a proper temperature.

Figure 4:
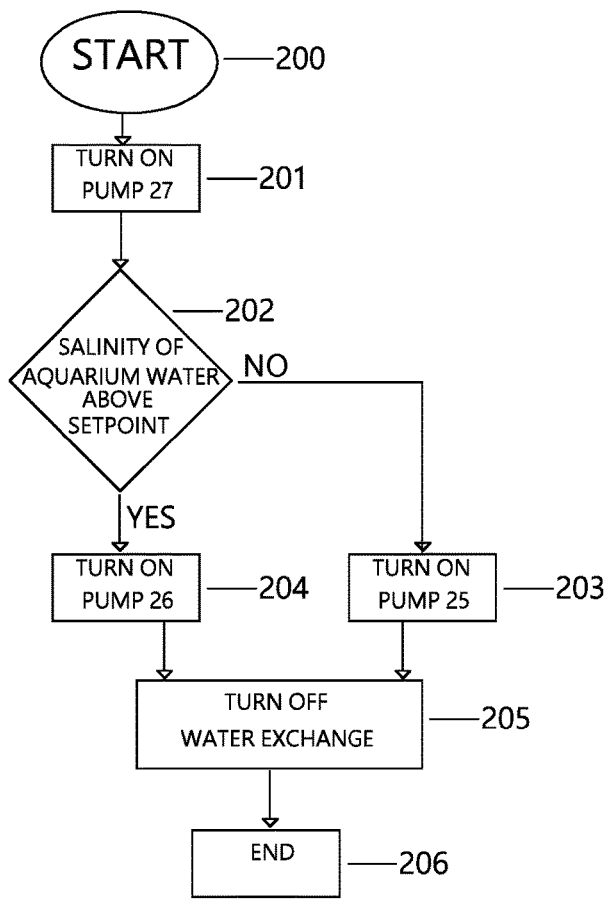
FIG. 4 is a flowchart illustrating an aquarium water exchange and salinity control sequence according to the invention.

With reference to FIG. 4, the aquarium water exchange and salinity control sequence may be started at a set time (e.g., once a day, several times a day, at defined times) or it may be manually started at step 200. First the aquarium pump 27 is turned on at step 201 and the salinity of the aquarium water is measured at step 202. If the salinity is too high, pump 25 is turned on so as to pump DI water from the DIR 10 into the aquarium at step 203. If the water is at setpoint salinity or below, pump 26 is turned on so as to pump salt-mixed water into the aquarium at step 204. The steps 202, 203 and 204 are cycled through until the water exchange is manually terminated or the timer clock 23 indicates that the water exchange has run for the set period of time at step 205. The program sequence ends at step 206.

The invention claimed is:

1. A water salinity control apparatus for a marine aquarium, the apparatus comprising:
   a filter section including a water inlet and filters configured to generate purified water suitable for use in the marine aquarium;
   a reservoir section including a purified water reservoir for purified water connected to receive purified water from said filter section, a salt-mixed water reservoir connected to receive water from said purified water reservoir, and a salt concentrate reservoir having an overflow conduit at an upper level thereof for allowing water to overflow into said salt-mixed reservoir;
   a pump section including:
      one or more pumps hydraulically connected to pump water from said salt-mixed water reservoir into said salt concentrate reservoir, to pump water from said salt-mixed water reservoir to the aquarium, and to pump water from said purified water reservoir to the aquarium; and
      a pump hydraulically connected to draw water out of the aquarium;
   a control system for adjusting a salinity of the water contained in said salt-mixed water reservoir and for adjusting a salinity of the water in the marine aquarium, said control system including a controller connected to said pumps of said pump section and to a plurality of salinity measuring probes, said probes including a probe disposed to measure the salinity in said salt-mixed water reservoir and a probe disposed to measure the salinity of the water of the marine aquarium.

2. The apparatus according to claim 1, wherein said filter section includes a particulate filter, a carbon activated filter, a reverse osmosis filter and a deionizer configured to generate deionized water from the water received at said water inlet.

3. The apparatus according to claim 1, comprising a valve disposed at said water inlet for selectively turning on and shutting off a fresh water supply to said filter section.

4. The apparatus according to claim 3, comprising a liquid level sensor disposed to sense whether or not a liquid level in said salt mixed water reservoir is above or below a setpoint fill level and connected to said valve, wherein said valve is turned on when the setpoint fill level is undershot.

5. The apparatus according to claim 1, wherein said one or more pumps of said pump section comprise:
   a first pump hydraulically connected to pump water from said salt-mixed water reservoir into said salt concentrate reservoir;
   a second pump hydraulically connected to pump water from said salt-mixed water reservoir to the aquarium; and
   a third pump hydraulically connected to pump water from said purified water reservoir to the aquarium.

6. The apparatus according to claim 5, wherein said pumps of said pump section are peristaltic pumps.

7. A salinity control method for a marine aquarium having an aquarium tank holding saltwater, the method comprising:
   connecting an apparatus according to claim 1 to the marine aquarium;
   flooding the reservoirs of the reservoir section with water and adjusting a salinity of the contents of the reservoirs until the purified water reservoir contains deionized water, the salt-concentrate water reservoir contains water with saturated salinity, and the salt-mixed water reservoir contains water have a salinity substantially corresponding to a desired salinity in the marine aquarium;
   pumping water from the aquarium and measuring a salinity of the aquarium water;
   if the salinity of the aquarium water lies above the desired salinity, pumping deionized water from the purified water reservoir into the aquarium;
   if the salinity of the aquarium water lies at or below the desired salinity, pumping salt-mixed water from the salt-mixed water reservoir into the aquarium.

8. The salinity control method according to claim 7, which comprises pumping the deionized water and the salt-mixed water into the aquarium by way of peristaltic pumps.

9. A water salinity control apparatus, the apparatus comprising:
   a filter section including a water inlet and filters configured to generate purified water;
   a reservoir section including a purified water reservoir for purified water connected to receive purified water from said filter section, a salt-mixed water reservoir connected to receive water from said purified water reservoir, and a salt concentrate reservoir configured to contain non-dissolved salt and salt water at salt saturation, said salt concentrate reservoir having an overflow conduit at an upper level thereof for allowing water to overflow into sad salt-mixed reservoir;
   a pump section including a pump hydraulically connected to pump water from said salt-mixed water reservoir into said salt concentrate reservoir;
   a control system for adjusting a salinity of the water contained in said salt-mixed water reservoir, said control system including a salinity measuring probe disposed to measure the salinity in said salt-mixed water reservoir and a controller connected to said pump section and to said salinity measuring probes.

* * * * *